B. H. JEFFERSON.
PEDAL DEVICE.
APPLICATION FILED NOV. 7, 1919.
1,379,570.
Patented May 24, 1921.
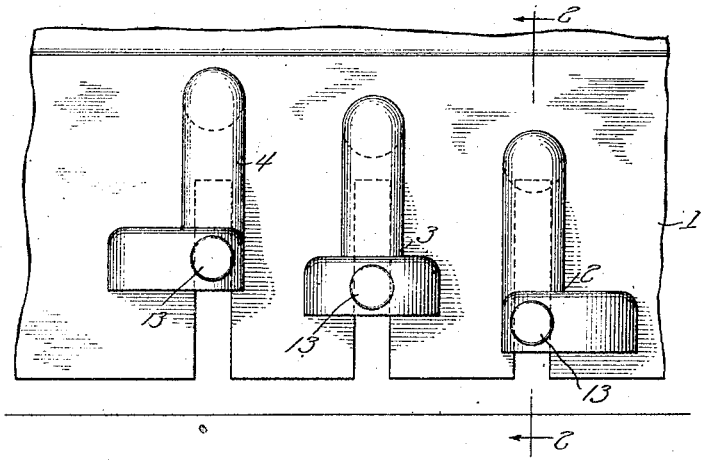
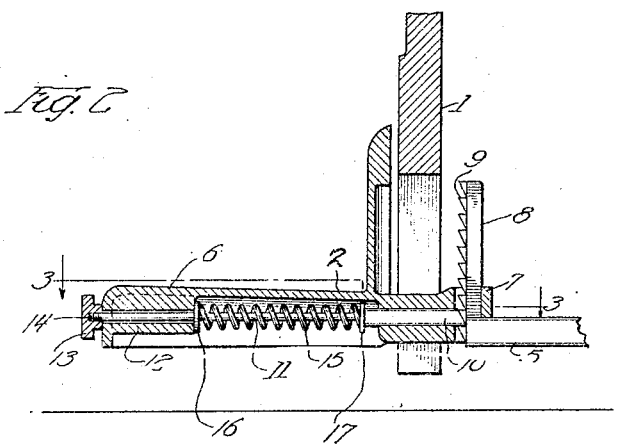
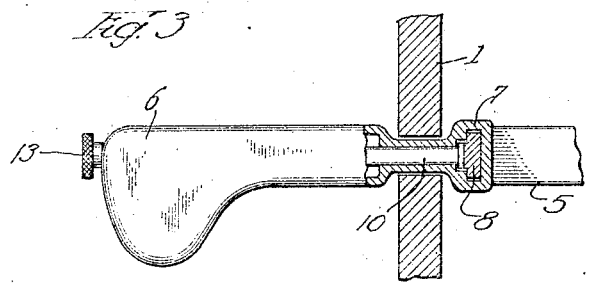
Inventor
Benjamin H. Jefferson

UNITED STATES PATENT OFFICE.

BENJAMIN H. JEFFERSON, OF CHICAGO, ILLINOIS, ASSIGNOR TO LYON & HEALY, OF CHICAGO, ILLINOIS, A CORPORATION OF ILLINOIS.

PEDAL DEVICE.

1,379,570.  Specification of Letters Patent.  Patented May 24, 1921.

Application filed November 7, 1919. Serial No. 336,270.

*To all whom it may concern:*

Be it known that I, BENJAMIN H. JEFFERSON, a citizen of the United States, residing at Chicago, in the county of Cook and State of Illinois, have invented a certain new and useful Improvement in Pedal Devices, of which the following is a full, clear, concise, and exact description, reference being had to the accompanying drawings, forming a part of this specification.

My invention relates to pedal devices, and particularly to pedal devices for use on pianos and like instruments.

One of the objects of the invention is to provide a pedal device which will accommodate persons of different height, such for example, as adult persons and children.

Another object of the invention is to arrange the accommodation for persons of different height so that it may extend over a substantial range and permit ready adaptation between extreme limits.

Another object of the invention is to permit the ready adaptation of the pedal device for such various sized persons in a quick, expeditious and effective manner.

Another object of the invention is to secure the foregoing and other desirable results in a simple and practical way.

In the accompanying drawings Figure 1 is a front elevational view of a front portion of a piano provided with pedals embodying my present invention;

Fig. 2 is a cross section taken on line 2—2 in Fig. 1;

Fig. 3 is a cross section taken on line 3—3 in Fig. 2.

In the drawings 1 show a portion 1 of the front board of a piano, and also show three pedals 2, 3 and 4, projecting from the front of said board 1. These pedals are understood to operate the usual instrumentalities in the piano which are ordinarily operated by three pedals.

To such end each pedal is connected with an operating member or rod, as for example, the bar or rod 5 operated by the pedal 2, (Fig. 2). The pedal proper 6 is arranged for vertical adjustment and to such end its rear is provided with a loop or ring member 7 which incloses an upright member 8 mounted on the front end of the bar or rod 5. The adjustment of the pedal 6 is obtained by raising and lowering it relatively to the bar 5, the member 7 sliding up and down the member 8.

As an arrangement for holding the pedal 6 to any position in vertical adjustment, the member 8 is preferably provided with rack teeth 9 and the pedal 6 is provided with a pin 10 which may be inserted into the spaces between the teeth 9 so as to engage the same and lock the pedal 6 in desired vertical adjustment.

As a means for controlling the pin 10 I show the same provided with a longitudinally extending spindle 11 which extends forwardly through the thick end portion 12 at the front of the pedal 6 and is engaged by an adjustable nut 13 fitted on the screw threaded end 14 of the spindle 11, so that said pin 10 may be moved longitudinally by moving said nut 13. A spring 15 preferably surrounds the spindle 11 and coöperates with washers 16 and 17 on the pin 10 and spindle 11, respectively, so that said spring 15 tends normally to hold the pin 10 in engagement with the teeth 9. By pulling out the spindle 11 by means of the nut 13, however, the pin 10 may be disengaged from the teeth 9 and thereby release the pedal 6 so that it may be adjusted up or down to any other desired vertical position and then again locked in such position by releasing the nut 13.

It will be understood that changes and modifications may be made without departing from the spirit of the invention.

What I claim is:

A pedal device comprising a pedal member and a support therefor, said support having an upwardly extending member provided with a rack and said pedal having a loop shaped member surrounding said upwardly extending member, a pin carried by the pedal member and adapted to coöperate with the teeth of said rack, said pin being provided with a longitudinally extending spindle projecting in front of the front end of the pedal member, an adjustable nut on the end of said spindle and a spring surrounding said spindle and inclosed within space in said pedal member, said spring being adapted to hold said pin normally in engagement with said rack.

In witness whereof, I hereunto subscribe my name this 3rd day of October, A. D., 1919.

BENJAMIN H. JEFFERSON.